United States Patent
Tertychnyi et al.

(10) Patent No.: US 12,189,653 B2
(45) Date of Patent: Jan. 7, 2025

(54) DETECTING CONFLICTS IN GEO-REPLICATION ARCHITECTURES

(71) Applicant: MICROSOFT TECHNOLOGY LICENSING, LLC, Redmond, WA (US)

(72) Inventors: Gennadii M. Tertychnyi, Issaquah, WA (US); Adelin M. Miloslavov, Bellevue, WA (US); Yue Zhao, Beijing (CN); Pijun Jiang, Beijing (CN); Chuanjie Liu, Beijing (CN); Samuel M. Bayless, Bellevue, WA (US); Yuntong Ding, Beijing (CN); Shi Zhao, Beijing (CN); Surender Parupalli, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/192,769

(22) Filed: Mar. 30, 2023

(65) Prior Publication Data
US 2024/0330316 A1 Oct. 3, 2024

(51) Int. Cl.
G06F 17/00 (2019.01)
G06F 7/00 (2006.01)
G06F 16/23 (2019.01)
G06F 16/27 (2019.01)

(52) U.S. Cl.
CPC .......... *G06F 16/27* (2019.01); *G06F 16/2358* (2019.01); *G06F 16/2365* (2019.01)

(58) Field of Classification Search
CPC ... G06F 16/27; G06F 16/2358; G06F 16/2365
USPC .......................................... 707/634
See application file for complete search history.

(56) References Cited

U.S. PATENT DOCUMENTS

| | | | | |
|---|---|---|---|---|
| 8,250,397 B2 * | 8/2012 | Marcy | ............... | G06F 16/1837 707/610 |
| 2006/0288053 A1 * | 12/2006 | Holt | ............... | G06F 16/273 707/999.203 |
| 2008/0168183 A1 * | 7/2008 | Marcy | ............... | G06F 16/178 709/248 |

(Continued)

OTHER PUBLICATIONS

"Vector clock", Retrieved from: https://en.wikipedia.org/wiki/Vector_clock#:~:text=A%20vector%20clock%20is%20an,the%20sending%20process's%20logical%20clock., Jul. 26, 2022, 4 Pages.

(Continued)

*Primary Examiner* — Pavan Mamillapalli
(74) *Attorney, Agent, or Firm* — CALFEE, HALTER & GRISWOLD LLP

(57) ABSTRACT

Technologies described herein relate to conflict detection in a geo-replication architecture that includes several computing systems, where a database is asynchronously updated at the several computing systems and update notifications are transmitted amongst the computing systems to ensure that the database is replicated across the computing systems. Partial vector clocks, instead of full vector clocks, are used to update the database at different computing systems, thereby using fewer network resources when compared to conventional approaches. Further, less than whole vector clocks can be persisted with records stored on disk, thereby using fewer disk resources when compared with conventional approaches.

20 Claims, 8 Drawing Sheets

(56) References Cited

U.S. PATENT DOCUMENTS

| | | | |
|---|---|---|---|
| 2009/0144343 A1* | 6/2009 | Holt | G06F 16/273 |
| | | | 707/999.203 |
| 2012/0166390 A1* | 6/2012 | Merriman | G06F 16/2365 |
| | | | 707/613 |
| 2012/0233251 A1* | 9/2012 | Holt | G06F 16/27 |
| | | | 709/204 |
| 2014/0344400 A1 | 11/2014 | Varney et al. | |
| 2015/0261563 A1* | 9/2015 | Guerin | G06F 9/466 |
| | | | 707/703 |
| 2016/0381099 A1 | 12/2016 | Keslin et al. | |
| 2019/0171650 A1 | 6/2019 | Botev | |
| 2019/0340168 A1 | 11/2019 | Raman et al. | |
| 2019/0370365 A1 | 12/2019 | Chalakov | |
| 2020/0348865 A1 | 11/2020 | Danilov et al. | |
| 2022/0121627 A1* | 4/2022 | Inbar | G06F 16/162 |

OTHER PUBLICATIONS

Kshemkalyani, et al., "Distributed Computing: Principles, Algorithms, and Systems", In Publication of Cambridge University Press, May 28, 2007, 747 Pages.

Raynal, et al., "Logical Time: Away to Capture Causality in Distributed Systems", Retrieved from: https://www.cs.drexel.edu/~bmitchell/course/mcs721/logtime.pdf, Jan. 1995, 24 Pages.

Scherger, et al., "A Visualization System and Monitoring Tool to Measure Concurrency in MPICH Programs", Retrieved from: http://worldcomp-proceedings.com/proc/p2013/PDP3631.pdf, Jul. 2013, 7 Pages.

International Search Report and Written Opinion received for PCT Application No. PCT/US2024/020040, May 29, 2024, 18 pages.

Shen, et al., "Causal Consistency for Geo-Replicated Cloud Storage under Partial Replication", In IEEE International Parallel and Distributed Processing Symposium Workshop, 2015, 10 pages.

\* cited by examiner

DETECTING CONFLICTS IN GEO-REPLICATION ARCHITECTURES

BACKGROUND

The term "geo-replication" refers to data storage replication technologies where multiple computing systems located in different geographical regions store data that is replicated across the multiple computing systems. Therefore, in an example, when a first computing system at a geographic location updates the data, such update is also to occur at every other computing system in the multiple computing systems (where the other computing systems are geographically distributed) such that, over time, the data converges across all of the multiple computing systems.

With the increasing popularity of cloud-based computing systems and global footprint of enterprises, timely and accurate geo-replication has become increasingly important. In an example, a team in an enterprise includes users that are geographically distributed across numerous states and countries, where members of such team are accessing and updating a database. A first computing system in a first geographic location receives updates from a first set of users of the team, a second computing system in a second geographic location receives updates from a second set of users of the team, and a third computing system in a third geographic location receives updates from a third set of users of the team. When the first computing system receives an update, the first computing system updates the database at the first computing system and then transmits the update to the second and third computing systems. Complexities arise when computing systems that store data that is to be replicated across the computing systems receive several updates to the data at irregular times. For instance, detection of conflicts (when, for example, an update is made to a same record in a database at two different locations at approximately the same time) can be problematic.

Vector clocks can be employed to identify update conflicts in distributed computing architectures where data is updated asynchronously (referred to as "active-active geo-replication architectures"). In a fully connected active-active geo-replication architecture, each computing system in the architecture directly communicates with every other computing system in the architecture to replicate data. Conventionally, data that is to be replicated in an active-active geo-replication architecture includes several atomic pieces, and each computing system maintains a vector clock for each atomic piece of data. As described herein, a database is to be replicated across the architecture, such that the atomic pieces of data are records of the database. The technologies described herein, however, are not limited to conventional databases. The vector clock for computing system A for a record includes several entries, with each entry in the vector clock corresponding to a respective computing system in the architecture. More specifically, when the architecture includes N computing systems where the database is to be replicated, the vector clock for a record of the database includes N entries (with one of those entries corresponding to computing system A).

When the computing system updates the record, the computing system updates the vector clock to indicate that the computing system has updated the record, and the computing system transmits the vector clock to the other computing systems in the architecture. In an example, the architecture includes three computing systems: computing system A, computing system B, and computing system C. At computing system A at time $T_0$, the vector clock for the record may be [A100; B200; C300]. At time $T_1$, computing system A can update the record, and accordingly update the vector clock to indicate that computing system A has made such update—for instance, computing system A updates the vector clock to be [A101; B200; C300] (it is noted that while in this example the entry corresponding to computing system A has been incremented; in other examples computing system A can update the vector clock to include a timestamp). At time $T_2$, computing system A transmits the vector clock to computing systems B and C. Computing systems B and C then compare the vector clock received from computing system A with their own (local) vector clocks, and based upon such comparison can determine whether a conflict exists and needs to be resolved.

Continuing with the example set forth above, the vector clock for the record maintained by computing system B can be [A100; B200; C300]. Upon receiving the vector clock [A101; B200; C300] from computing system A, computing system B can compare the two vector clocks and determine that there are no conflicts, since the comparison between the two vector clocks indicates that there have been no other unaccounted for updates to the record other than the update made by computing system A. Computing system B can then update its local vector clock for the record to be [A101; B200; C300].

Continuing still further with this example, computing system ((at approximately $T_1$—the same time that computing system A updated the record) updates the record and then updates its local vector clock to be [A100; B200; C301]. This vector clock does not reflect the update to the record made by computing system A, as computing system C has not yet received the updated vector clock from computing system A. Computing system (transmits the updated vector clock to computing systems A and B. After updating its local vector clock to be [A100; B200; C301], computing system C receives the vector clock [A101; B200; C300] from computing system A. Computing system C can identify an update conflict based upon a comparison between the local vector clock of computing system C ([A100; B200; C301]) and the vector clock received from computing system A, since computing system A did not recognize the update made to the record by computing system C (as evidenced by C300 being included in the vector clock received from computing system A rather than the value C301 as included in the local vector clock of computing system C). Computing systems A and B will also detect the update conflict, and the computing systems can then initiate a conflict resolution protocol to address the conflict.

Using this approach, when a computing system notifies other computing systems of an update, the computing system transmits the full vector clock to all other computing systems in the architecture. As the number of computing systems in the architecture grows, the size of the vector clock also grows, resulting in inefficient use of network resources when transmitting vector clocks between computing systems. In addition, using the approach described above, the full vector clock must be persisted to each record in disk, which results in a significant amount of storage being employed to store vector clocks. Still further, when a first computing system receives an updated vector clock from a second computing system for an update to a record, the first computing system must retrieve an entirety of the vector clock for the record from disk, which is undesirable in latency-sensitive distributed storage systems.

SUMMARY

The following is a brief summary of subject matter that is described in greater detail herein. This summary is not intended to be limiting as to the scope of the claims.

Described herein are technologies related to employment of vector clocks in a geo-replication computing architecture that comprises several geographically dispersed computing systems. In an example, the geo-replication computing architecture is a fully-connected active-active geo-replication computing architecture. In such an architecture, each computing system updates data that is to be replicated across the computing systems at arbitrary times and notifies other computing systems in the architecture of the update. Therefore, update notifications are received asynchronously between computing systems of the architecture, and the computing systems asynchronously update their own copies of the data. Over time, the updates converge such that the data is replicated across the computing systems of the architecture.

In contrast to the conventional approach of transmitting entireties of vector clocks between computing systems when an update is made to the data, partial vector clocks are transmitted. In an example, the computing architecture includes N computing systems, and each computing system maintains its own local vector clock for the data. In an example, the data can be a record in a database. Therefore, a local vector clock for the record of a database that is to be replicated across computing systems of the architecture includes N entries. The N computing systems include computing system A and computing system B, and thus computing system A maintains local vector clock A for the record and computing system B maintains local vector clock B for the record. When computing system A notifies computing system B of an update for the record, rather than transmitting an entirety of the local vector clock A to computing system B, computing system A transmits a partial vector clock to computing system B, where the partial vector clock includes values for entries in local vector clock A that have changed since the most recent time that computing system A transmitted an update notification (a partial vector clock) to computing system B. Thus, the partial vector clock does not include values that have not changed in local vector clock A since the most recent time that computing system A transmitted a partial vector clock to computing system B.

Computing system B, upon receipt of the partial vector clock from computing system A, constructs an updated remote vector clock that is an estimate of local vector clock A maintained by computing system A based upon the partial vector clock and a previous state of the remote vector clock A maintained by computing system B. Computing system B then compares the updated remote vector clock (which is an estimate of local vector clock A) with local vector clock B and determines whether a conflict exists with respect to the update to the record based upon the comparison. When computing system B does not detect a conflict, computing system B updates local vector clock B for the record. Each computing system in the architecture performs similar processes when generating and transmitting partial vector clocks and checking for conflicts. From the foregoing, it can be ascertained that network resources are conserved, as entire vector clocks are not transmitted to identify updates.

Other technologies are described herein to address deficiencies associated with conventional geo-replication technologies. For example, rather than persisting an entire vector clock with each record that is to be replicated on disk, a single value is persisted with the record, where the single value identifies a computing system that most recently updated the record. This value is referred to as a Global Change Number (GCN), where the GCN can represent the computing system that most recently updated the record and optionally a clock value (or increment value) that indicates when the record was updated.

Still other technologies are directed towards creating a table of information that is small enough to remain in memory of a computing system in the geo-replication architecture but that can be employed to construct estimates of local vector clocks (thereby reducing a number of reads from disk when compared to conventional approaches that use vector clocks to detect conflicts). The table can include hash values of keys and vector clocks for those hash values. More specifically, key values in the database can be hashed to form hash values, where the number of unique key values represented by a single hash value can be selected. In an example, the database can include 10,000 unique key values, and the computing system can be configured to generate a unique key hash value for every 100 unique key values. Accordingly, the table can include 100 key hash values. Thus, when a key hash value represents 100 unique key values, the vector clock information assigned to the key hash value is a summary (e.g., aggregate) of vector clocks of the 100 unique keys. Accordingly, the table can be constructed to have a size that allows the table to be permanently retained in memory of the computing system.

In an example, computing system A includes such a table, and receives an indication from computing system B that a record having a particular key value is to be updated in the database. Computing system A identifies a vector clock assigned to a key hash value that is representative of the key value. Computing system A employs the vector clock as an estimate of a local vector clock of the record. Computing system A constructs the updated remote vector clock for the record based upon the partial vector clock received from computing system B and a remote vector clock of the record for computing system B. Computing system A compares the estimated local vector clock with the updated remote vector clock to determine whether there is a potential conflict. When no conflict is identified, the update is written to the record. When a conflict is identified, a sequence of checks is undertaken to ensure that the conflict is not a false positive (caused by estimating vector clocks instead of maintaining actual vector clocks).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
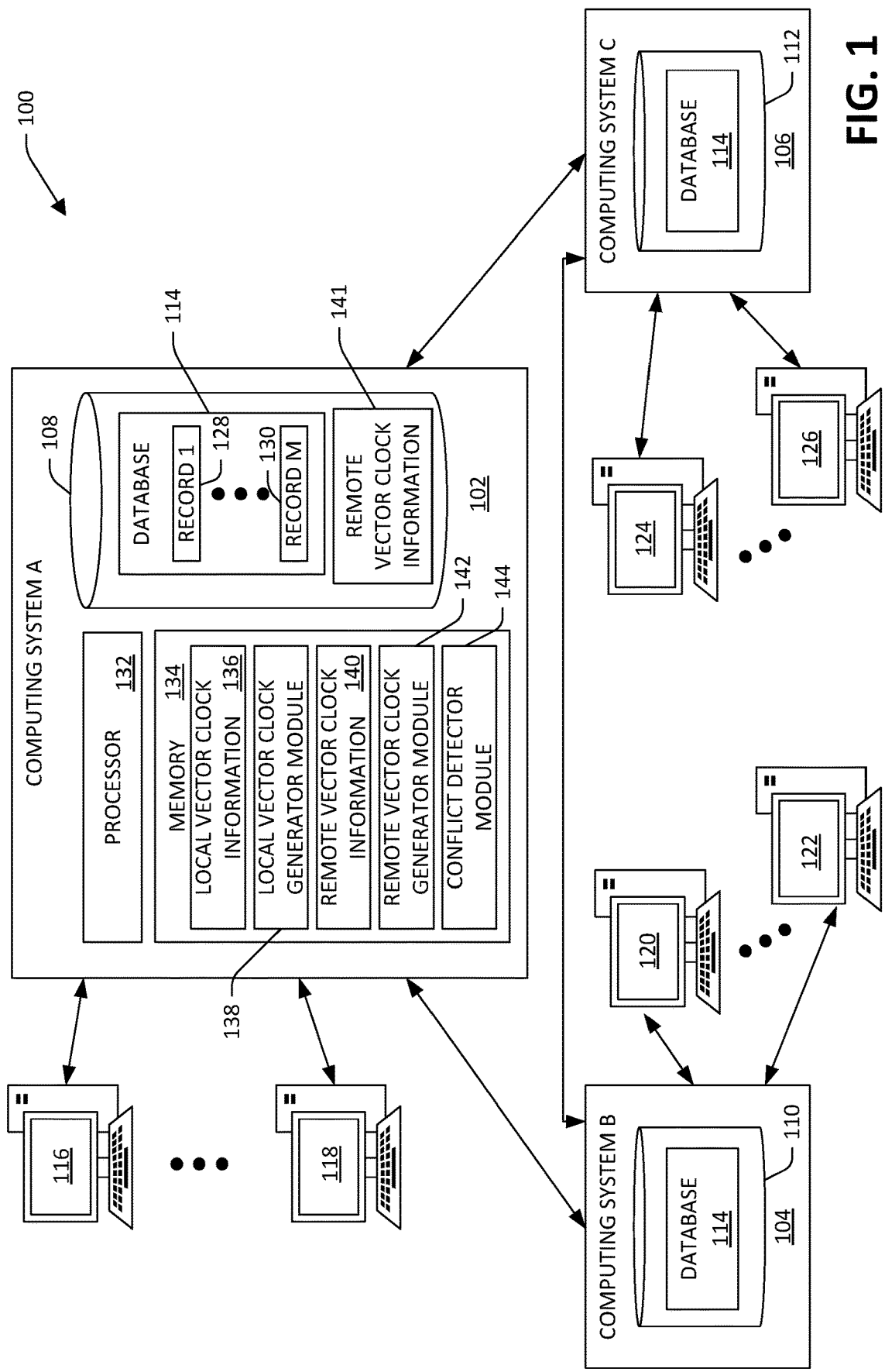
FIG. 1 is a functional block diagram of a geo-replication computing architecture.

Various technologies pertaining to a geo-replication computing architecture are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "system," and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein are various technologies pertaining to a geo-replication computing architecture, where updates to a database are to be replicated across computing systems that belong to the architecture. In contrast to conventional approaches for updating a database record in such an architecture, a first computing system, when transmitting an indication to a second computing system that an update to a record is to be made to the database record, transmits a partial vector clock for the record to the second computing system (rather than a full vector clock). Transmittal of the partial vector clock conserves network resources when compared to the conventional approaches. In addition, rather than a full vector clock being stored in metadata for each record, a single global change number (GCN) is stored in the metadata, resulting in a reduction in use of disk space when compared to conventional approaches. Still further, a computing system in the geo-replication architecture can construct local vector clocks and remote vector clocks based upon a relatively small amount of information that is maintained in memory; accordingly, the computing system need not read from record metadata stored on disk when constructing vector clocks, resulting in updates being written more quickly to the database. These features are described in greater detail below.

Referring now to FIG. 1, a functional block diagram of a geo-replication computing architecture 100 is illustrated. The architecture 100 includes computing system A 102, computing system B 104, and computing system C 106, where the computing systems 102-106 are each in communication with one another. Thus, in the architecture 100, the computing systems 102-106 are fully connected.

The computing systems 102-106 store and update a database that is to be replicated across the computing systems 102-106, where updates to the database occur asynchronously. Specifically, computing system A includes a first disk 108, computing system B includes a second disk 110, and computing system C includes a third disk 112. The disks 108-112 store a database 114 that is replicated across the computing systems 102-106; thus, when the database 114 is updated on the first disk 108, the database 114 is to be updated on the second disk 110 and the third disk 114. While the computing architecture 100 is illustrated as including the computing systems 102-106, it is to be understood that the computing architecture 100 can include many more than three computing systems, where the computing systems can be located in different geographic regions.

The task of asynchronously updating the database 114 across the computing systems 102-106 such that the database 114 is replicated across the computing systems 102-106 is non-trivial. For example, first computing devices 116-118 are in communication with computing system A 102, where the first computing devices 116-118 and computing system A 102 are co-located in a first geographic region. Computing system A can receive requests to update the database 114 from any of the computing devices in the first computing devices 116-118 at arbitrary times. Further, second computing devices 120-122 are in communication with computing system B 104, where the second computing devices 120-122 and computing device B 104 are co-located in a second geographic region. Computing system B 104 can receive requests to update the database 114 from any of the computing devices in the second computing devices 120-122 at arbitrary times. Still further, third computing devices 124-126 are in communication with computing system C 106, where the third computing devices 124-126 and computing system C 106 are co-located in a third geographic region. Computing system C 106 can receive requests to update the database 114 from any of the computing devices in the third computing devices 124-126 at arbitrary times.

In the computing architecture 100, there is no predefined sequence that identifies an order that the computing systems 102-106 are to update the database 114. Thus, when computing system A 102 receives an update request from one of the first computing devices 116-118, computing system A 102 updates the database 114 in the first disk 108 and then transmits an update notification to computing system B 104 and computing system C 106. Similarly, when computing system B 104 receives an update request from one of the second computing devices 120-122, computing system B updates the database 114 in the second disk 110 and then transmits an update notification to computing system A 102 and computing system C 106. In the architecture 100, then, conflicts may arise, where two computing systems update a same portion of the database 114 at approximately the same time.

As noted above, vector clocks have been used as a mechanism to detect conflicts in geo-replication architectures. For a computing architecture that has N computing systems, the vector clock has N Global Change Numbers (GCNs), with one GCN for each computing system in the architecture. A GCN identifies a computing system and is further indicative of when a computing system that corresponds to the GCN most recently initiated an update for the record. For instance, the GCN includes a timestamp. In another example, the GCN is a value that is incremented each time that the computing system updates the record. Conventionally, each computing system in a geo-replication architecture stores a vector clock for each record of a database that is to be replicated across several computing systems, where a vector clock is stored on disk as metadata for a record. Then, when a computing system updates a record in the database, the computing system transmits the vector clock stored for that record to the other computing systems in the architecture. When a computing system receives a vector clock from another computing system, the computing system retrieves the vector clock stored on the disk of the computing system and compares the two vector clocks (the vector clock received from the another computing system and the vector clock retrieved from disk) to determine whether an update conflict exists with respect to the record. The inventors identified several technical deficiencies with this approach: 1) transmittal of a vector clock for each update consumes a relatively large amount of network resources, particularly when updates are frequent and there are a relatively large number of computing systems in the architecture; 2) storing a vector clock for each record in a database consumes a relatively large amount of space in disk; and 3) reading a vector clock from disk each time an update request is received results in slow writes to disk, as switching between reads and writes to disk is inefficient.

Figure 2:
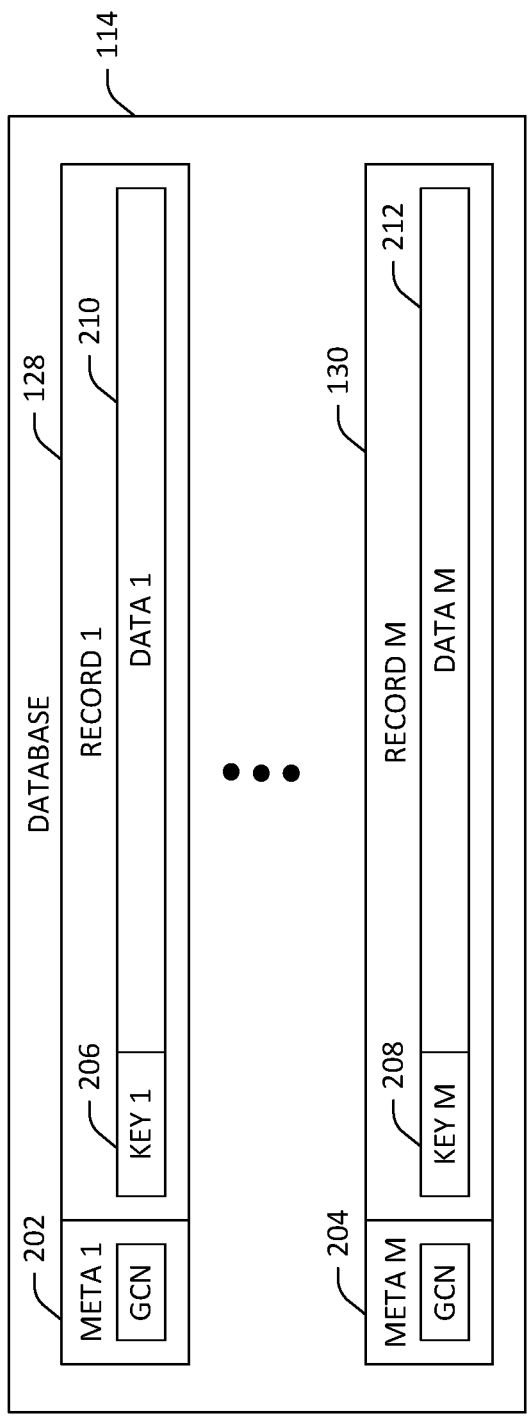
FIG. 2 is a schematic that depicts contents of a database that is replicated across the geo-replication computing architecture of FIG. 1.

Technologies described herein address these technical deficiencies in geo-replication architectures, such as the architecture 100 depicted in FIG. 1. As illustrated in FIG. 1, the database 114 includes M records 128-130. Referring briefly to FIG. 2, a schematic 200 depicting the database 114 as stored in the first disk 108 at a particular point in time is illustrated. The database 114 includes the M records 128-130 and metadata stored in correlation with the M records 128-130. Specifically, the database 114 includes first metadata 202 stored in correlation with the first record 128 and Mth metadata 204 stored in correlation with the Mth record 130. The metadata for a record includes a GCN that identifies a computing system from amongst the computing systems 102-106 that initiated a most recent update to the record.

Therefore, the first metadata 202 includes a GCN that identifies a computing system that initiated a most recent update to the first record 128 and further includes information that is indicative of when the computing system identified by the GCN initiated the update. In an example, when computing system A 102 updated the first record 128 based upon an update request received from a computing device in the first computing devices 116-118, the GCN stored in the first metadata 202 identifies computing system A 102 (e.g., GCN_A). The Mth metadata 204 includes a GCN that identifies a computing system that initiated a most recent update to the Mth record 130 and further includes information that is indicative of when the computing system identified by the GCN initiated the update. For instance, when computing system A 102 updated the Mth record 130 based upon an update notification from computing system B 104, the GCN stored in the Mth metadata 204 identifies computing system B 102 (e.g., GCN_B).

The records 128-130 further include respective keys 206-208 and respective data 210-212 that can be updated. Thus, the M records 128-130 have M keys 206-208 and M pieces of data 210-212 that can be updated by computing system A 102, where computing system A 102 can update the data in the records 128-130 in response to receiving an update request from a computing device in the first computing devices 116-118 or in response to receiving an update notification from another computing system in the architecture 100.

In contrast to conventional approaches used for conflict detection in geo-replication architectures, a single GCN is stored in the metadata for a record. Thus, the first metadata 202 includes a single GCN and the Mth metadata 204 includes a single GCN. In conventional technologies, the first metadata 202 includes an entire vector clock and the Mth metadata 204 includes an entire vector clock. This can be a relatively large reduction in an amount of disk storage needed to store the database 114, particularly when vector clocks are relatively long (e.g., when there are a large number of computing systems in the geo-replication architecture 100). In some embodiments described herein, however, the database 114 can include full vector clocks for each record.

Returning to FIG. 1, operation of computing system A 102 is now set forth with respect to updating the database 114 in the first disk 108, transmitting update notifications to other computing systems in the architecture 100, and receiving update notifications from other computing systems in the architecture 100 and checking for update conflicts. Computing system A 102 includes a processor 132 and memory 134, where the memory 134 stores instructions that are executed by the processor 132 and information that is accessible to the processor 132. Computing system A can receive a request to update a record (e.g., the first record 128) in the database 114 from a computing device in the first computing devices 116-118. Based upon the request, computing system A 102 can update the first data 210 in the first record 128 and then transmit a partial vector clock for the first record 128 to computing system B 104 and computing system C 106. The partial vector clock includes only values that have changed since the last time that computing system A 102 transmitted a partial vector clock for the first record 128 to computing system B 104 and computing system C 106.

In an example, at time $T_0$, the local vector clock for the first record 128 at computing system A 102 is [A100; B100; C100]. At time $T_1$, computing system A 102 updates the first data 210 in the first record 128, updates the local vector clock to be [A101; B100; C100], and transmits a first update notification to the computing systems 104-106. The first update notification includes a partial vector clock [A101] and the update made to the first data 210 in the first record 128. The partial vector clock is limited to include values that have changed since the last time that computing system A 102 transmitted a partial vector clock for the first record 128. In an embodiment, computing system A 102 further updates the GCN in the first metadata 202 to be A101. At time $T_2$, computing system A 102 receives a second update notification from computing system B 104 (where the update notification includes a partial vector clock from computing system B 104); based upon the second update notification, computing system A 102 updates the local vector clock to be

[A101; B101; C100]. In an embodiment, computing system A 102 updates the GCN in the first metadata 202 to be B101. At time $T_3$, computing system A 102 receives an update request from computing device 116, updates the first data 210 in the first record 128 based upon such update request, and updates the local vector clock for the first record 128 to be [A102; B101; C100]. Computing system A 102 then transmits a third update notification to the computing systems 104-106, where the third update notification includes the partial vector clock [A102; B101] and the update made to the first data 210. The partial vector clock includes A102 and B101 (but not C100), as A102 and B101 are changes when compared to corresponding values in the last partial vector clock for the first record 128 transmitted by computing system A 102 (i.e., A101 to A102 and B100 to B101).

Transmitting partial vector clocks amongst computing systems in the architecture 100 rather than full vector clocks conserves network resources, particularly when the computing architecture 100 includes a relatively large number of computing systems. In addition, a first computing system in the architecture 100 that receives a partial vector clock from a second computing system can accurately reconstruct the full (remote) vector clock of the second computing system based upon the partial vector clock and state information that is indicative of previous vector clock values transmitted by the second computing system.

Computing system A 102 (and additionally the computing systems 104-106) can also store information in memory 134 that allows for local and/or remote vector clocks to be retrieved, computed or estimated without reading data from the disk 108, thereby allowing for updates to be written more quickly to the disk 108 when compared to conventional approaches (as frequent reads between writes result in writes being completed more slowly). The memory 134 includes local vector clock information 136 that includes information that can be used to estimate local vector clocks for records in the database 114. As described above, metadata for a record may not include a full vector clock for the record, but instead may include a single GCN that identifies the computing system that initiated the update for the record and includes data that is indicative of when the update for the record was made. Instead of maintaining a per-record vector clock, the local vector clock information 136 stored in the memory 134 includes vector clock information for a key in the database 114.

In an example, the computing system A receives an update notification for a record from another computing system in the architecture 100. For instance, computing system A 102 receives an update notification from computing system B 104 that indicates that the first record 128 is to be updated in the database 114 stored in the first disk 108. The update notification includes the first key 206 for the first record 128 (FIG. 2), a partial vector clock that includes a GCN of computing system B 104 that is indicative of when computing system B 104 updated the database 114 in the second disk 110, and data that is to replace the first data 210 in the first record 128 (or a computer-executable instruction that causes the first data 210 to be updated in the first record 128). The partial vector clock can also include GCNs of other computing systems that have relatively recently updated the first record 128 in their respective disks (where such updates occurred prior to computing system B 104 transmitting the update notification).

To detect a potential conflict with respect to the received update request, the computing system A 102 compares a remote vector clock for the first record 128 corresponding to computing system B to an estimate of the local vector clock for the first record 128. The computing system A 102 includes a remote vector clock generator module 142. The remote vector clock generator module 142 computes the remote vector clock for the first record 128, where the remote vector clock for the first record 128 is an estimate of the vector clock of computing system B 104 for the first record 128. In various embodiments, remote vector clocks for all records in the database 114 can be retained in memory 134 as remote vector clock information 140. In such embodiments, the remote vector clock of computing system B for the first record 128 can be computed by retrieving the existing remote vector clock from the remote vector clock information 140 and updating the remote vector clock based upon the partial vector clock included in the update notification.

It can be ascertained, however, that it may be impractical to retain remote vector clocks for all records in the database 114 and for all computing systems in the architecture 100. Remote vector clocks of computing systems that have recently updated records can be maintained in a cache (e.g., included in the remote vector clock information 140 retained in the memory 134). Therefore, in this example, when computing system B 104 recently transmitted a first update notification to computing system A 102 for the first record 128, computing system A 102 computes a remote vector clock for the first record 128 and computing system B 104 and temporarily stores the remote vector clock in cache. When computing system B 104 transmits a second update notification to computing system A 102 for the first record 128, computing system A 102 retrieves the remote vector clock from the cache and updates the remote vector clock based upon information in the second update notification. Computing system A 102 can then store the updated remote vector clock in the cache. When computing system B 104 has not recently transmitted an update notification to computing system A 102 for the first record 128 the remote vector clock for the first record 128 for computing system B may not be stored in cache. In such instances, computing system A 102 can retrieve the remote vector clock from remote vector clock information 141 that is stored on the first disk 108.

The cache is relatively small, however, and therefore oftentimes a local vector clock for a record that is to be updated will not be stored in the cache. The local vector clock information 136 can be employed by computing system A 102 to generate estimates of local vector clocks for the records 128-130 in the database 114. The local vector clock information 136, in summary, includes local vector clock information for different "buckets" of keys, where a bucket of keys includes several (but not all) keys of the records 128-130 of the database 114. While not shown, the memory 134 of computing system A 102 includes a hash function, and the keys 206-208 of the records 128-130 are provided as input to the hash function. The hash function outputs hash values for the keys 206-208, where the hash function can output a same hash value for several keys, thus forming several buckets of keys. The local vector clock information 136 can include these hash values and respective local vector clocks assigned to the hash values. In another example, the local vector clock information 136 includes a mapping between keys and buckets of keys, as well as respective local vector clocks assigned to the buckets of keys. Therefore, in an example, when the database 114 includes 1000 records, and each bucket of keys includes 10 keys, the local vector clock information 136 can include 100 local vector clocks (rather than 1000 local vector clocks). Using this approach, the local vector clocks assigned to the buckets of keys can be retained in the memory 134. The number of buckets of keys (and keys to include in the buckets) can be determined empirically and selected to minimize false positive conflicts subject to a constraint imposed by available space in the memory 134.

The local vector clock generator module 138 can generate estimates of local vector clocks in response to receipt of update notifications from computing systems in the architecture 100. Continuing with the example above where computing system A 102 receives an update notification for computing system B 104 to update the first record 128, the local vector clock generator module 138 identifies the first key 206 in the update notification and identifies a remote vector clock that corresponds to the first key 206 in the local vector clock information 136. In an example, the local vector clock generator module 136 provides the first key 206 as input to the hash function, and the hash function outputs a hash value for the first key 206. The local vector clock generator module 138 obtains the local vector clock assigned to the hash value from the local vector clock information 136. The local vector clock is an estimate of the local vector clock for the first record 128. Effectively, the estimate of the local vector clock is a summary of the local vector clocks for all keys belonging to the same key bucket as the first key 206.

Responsive to determining that no conflict exists with respect to the update (e.g., based on consistency between the updated remote vector clock for the first record 128 and the estimate of the local vector clock for the first record 128), the local vector clock generator module 138 updates the local vector clock assigned to the hash value. The local vector clock generator module 138 updates the local vector clock based upon GCN(s) identified in the partial vector clock in the update notification. By way of example, the local vector clock generator module 138 updates the local vector clock assigned to the hash value. Computing system A can further update the metadata 202 associated with the first record 128 to include the GCN of computing system B with respect to the first record 128.

Pursuant to an example, a key bucket can include the first key 206 and the Mth key 208. In the local vector clock information 136, at time $T_0$, the local vector clock for the key bucket can be [A150; B155; C160]. At time $T_1$, computing system A 102 receives a first update notification from computing system B 104, where the first update notification includes the first key 206, the partial vector clock [B158], and data that is to be included in the first record 128. The local vector clock generator module 138 identifies the key bucket based upon the first key 206 included in the first update notification, retrieves the local vector clock from the local vector clock information 136 that is assigned to the key bucket, and updates the local vector clock to be [A150; B158; C160]. Subsequently, at time $T_2$, computing system A 102 receives a second update notification from computing system C 106, where the second update notification includes the Mth key 208, the partial vector clock [C165], and data that is to be included in the first record 128. The local vector clock generator module 138 identifies the key bucket based upon the Mth key 208 included in the second update notification, retrieves the local vector clock [A150; B158; C160] that is assigned to the key bucket, and updates the local vector clock to be [A150; B158; C165]. Therefore, the remote vector clock included in the remote vector clock information 140 includes GCNs that correspond to updates made to two different records having two different keys.

Computing system A 102 further includes a conflict detector module 144 that detects update conflicts based upon estimated local vector clocks output by the local vector clock generator module 138 and remote vector clocks output by the remote vector clock generator module 142. An update conflict occurs when two or more computing systems in the architecture have updated a record without knowledge that other computing system(s) have updated the record. Put differently, an update conflict occurs when two or more computing systems update a same record at approximately a same point in time. Continuing with the example where computing system A 102 receives the update notification from computing system B 104 that computing system B 104 has updated the first record 128, the conflict detector module 144 retrieves the estimated local vector clock for the first record 128 (e.g., a local vector clock for a key bucket that includes a key assigned to the first record 128, as described above). The conflict detector module 144 retrieves and updates the remote vector clock of computing system B for the first record 128 (included in the remote vector clock information 140 or the remote vector clock information 141, as described above) in response to computing system A 102 receiving the update notification.

The conflict detector module 144 performs a comparison between the estimated local vector clock and the (updated) remote vector clock and outputs an indication as to whether a potential conflict exists with respect to the update notification based upon the comparison. When each value in the estimated local vector clock is less than or equal to its corresponding value in the remote vector clock, the conflict detector module 144 outputs an indication that no conflict exists with respect to the update notification. In an example, the estimated local vector clock is [A0; B158; C0], while the remote vector clock o is [A150; B158; C160]. Because each value in the estimated local vector clock is less than or equal to its corresponding value in the remote vector clock, the conflict detector module 144 outputs an indication that no conflict has been detected. Thereafter, computing system A 102 can write the update included in the update notification to the first disk 108. It is noted that computing system A 102 can write to the first disk 108 to update the database 114 without having to read from the first disk 108 to identify a potential conflict; this greatly increases speed at which updates can be written to the database 114 stored in the first disk 108.

Alternatively, when the conflict detector module 144 determines that one value in the estimated local vector clock is greater than its corresponding value in the remote vector clock, the conflict detector module 144 can output an indication that a potential conflict exists. Because the determination of a conflict is based upon estimated local vector clocks (e.g., vector clocks pertaining to key hash buckets), it is possible that the detected conflict is a false positive (e.g., the conflict detector module 144 has detected a conflict where no conflict exists). In an example, the estimated local vector clock for a key bucket pertaining to a record is [A150; B150; C10], while the remote vector clock of the record is [A150; B140; C10]. In this case, the conflict detector module 144 determines that a potential conflict exists, as B150 is greater than B140. In such a case, the conflict detector module 144 can refine the estimated local vector clock by retrieving the GCN assigned to the first record 128 from the first metadata 202.

It is noted that the conflict detector module 144 need not read the entirety of the first record 128 from the first disk 108; instead, the conflict detector module 144 can read only the first metadata 202 and retrieve the GCN included therein in connection with refining the estimated local vector clock. In an example, the GCN included in the first metadata 202 is B130; therefore, the conflict detector module 144 can refine the estimated local vector clock to be [A150; B130; C10]. The conflict detector module 144 performs a comparison between the (refined) estimated local vector clock ([A150; B130; C10]) and the remote vector clock ([A150; B150; C10]); in this example, there is actually no conflict, and computing system A 102 updates the first record 128 based upon data included in the update notification received from computing system B 104. When the conflict detector module 144 confirms that a conflict does in fact exist, conventional conflict resolution techniques can be employed (e.g., the first data 210 can be read from the database 114 and a merge operation can be performed with respect to the first data 210 and the data included in the updated notification).

Returning briefly to construction of estimated local vector clocks, a similar approach for constructing estimated local vector clocks is employed by the local vector clock generator module 138 to generate partial vector clocks for records when computing system A 102 updates a record in the database 114 in response to an update request from a computing device in the first computing devices 116-118. In an example, computing system A 102 receives an update request for the first record 128 from the computing device 116. The update request identifies a key for the first record 128. The local vector clock generator module 138 identifies a key bucket corresponding to the key, and retrieves the vector clock corresponding to the key bucket. Computing system A 102 updates the first record 128 in the database 114 and adds a GCN for computing system A 102 to the first metadata 202 for the first record 128 (indicating that computing system A is the computing system in the architecture 100 that initiated the update and an approximate time when the update was made). The local vector clock generator module 138 constructs a partial vector clock based upon the vector clock corresponding to the identified key bucket, and then updates the partial vector clock to include the GCN for computing system A 102. Computing system A 102 then transmits the partial vector clock to other computing systems in the architecture 100.

While the description above has referred to operations of computing system A 102, it is understood that computing system B 104 and computing system C 106 also perform such operations in response to receiving update requests from computing devices and/or in response to receiving update notifications from other computing systems in the architecture. Therefore, computing system B 104 and computing system C 106 include local vector clock information, a local vector clock generator module, remote vector clock information, a remote vector clock generator module, and a conflict detector module. As noted previously, the computing architecture 100 exhibits various technical advantages over conventional computing architectures, including reduction in disk space for storing metadata for records in a geo-replicated database, reduction in use of network bandwidth when transmitting vector clock information between computing systems, and faster writing of updates to the database 114 stored in the disks 108-112.

Figure 3:
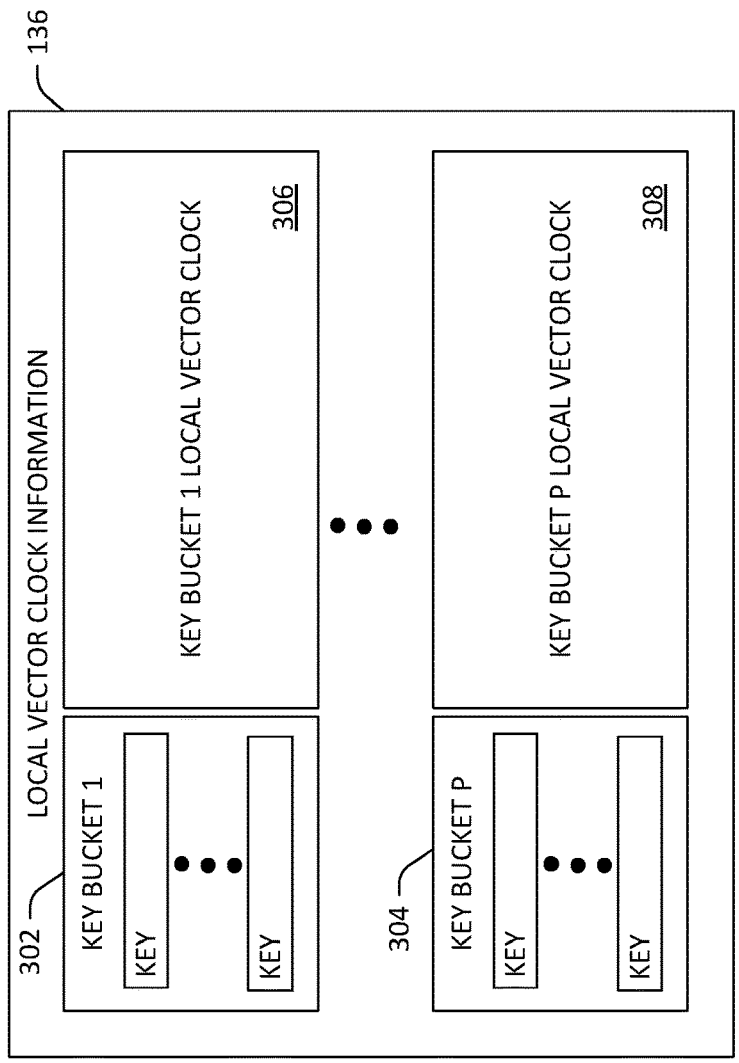
FIG. 3 is a schematic that illustrates local vector clock information that can be used by a computing system in the geo-replication computing architecture of FIG. 1 to compute a remote vector clock for a record in the database.

Turning now to FIG. 3, a schematic that depicts content of the local vector clock information 136 is presented. The local vector clock information 136 includes identifiers for key buckets 302-304, where each key bucket represents a respective (non-overlapping) set of keys. That is, a key is included in one and only one key bucket. As described above, a hash function can be employed to place keys into key buckets. The local vector clock information 136 also includes local vector clocks 306-308 assigned to the respective key buckets 302-304.

Figure 4:
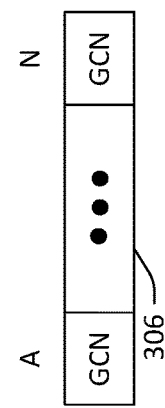
FIG. 4 is a functional block diagram of a computer-executable module that identifies estimated local vector clocks.
Figure 4:
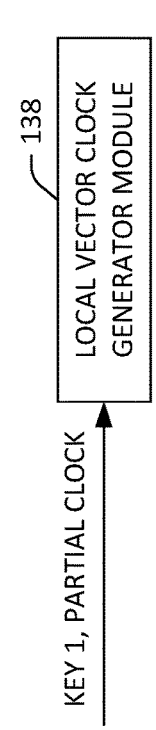

With reference to FIG. 4, a functional block diagram that depicts operation of the local vector clock generator module 138 is presented. The local vector clock generator module 138 receives an update notification from computing system B 104, where the update notification includes the first key 206 and a partial vector clock. The local vector clock generator module 138 identifies the first key 206 in the update notification and identifies an appropriate key bucket based upon the first key 206. As indicated above, the local vector clock generator module 138 can provide the first key 206 as input to the hash function and can identify the first key bucket 302 based upon a hash value for the first key 206 output by the hash function.

Figure 5:
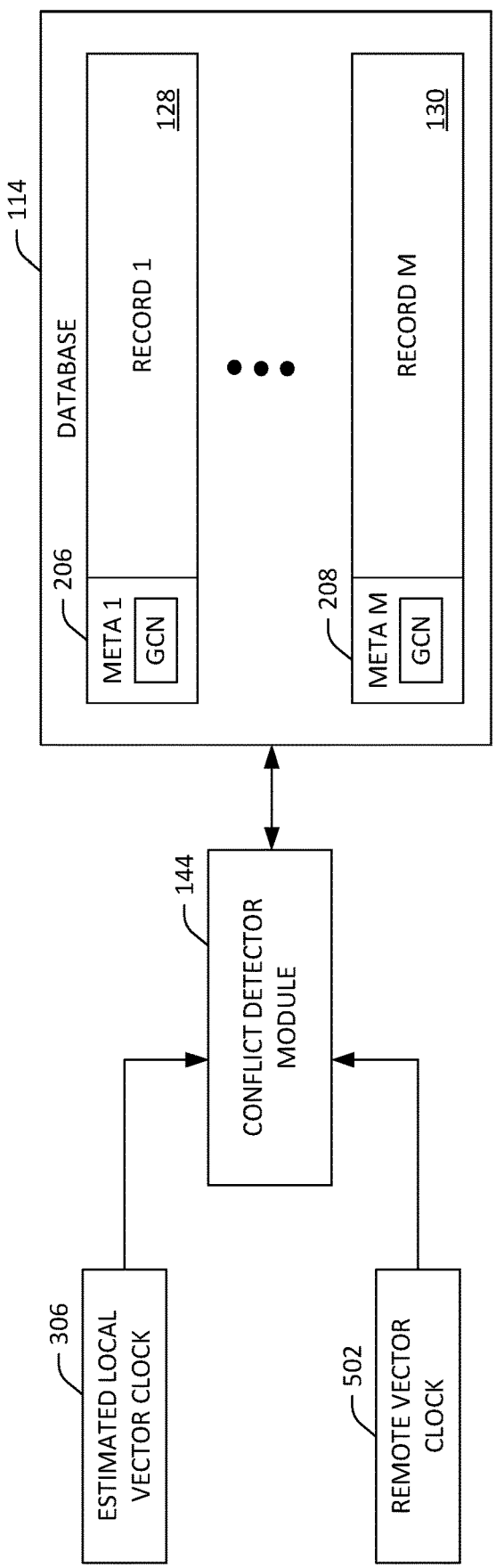
FIG. 5 is a functional block diagram of a computer-executable module that detects a conflict with respect to an update to a database record based upon a local vector clock and a remote vector clock constructed for the record.

The local vector clock generator module 138 retrieves the local vector clock 306 for the first key bucket 302 from the local vector clock information 140. The local vector clock 306 includes N values for the N computing systems in the architecture 100. If no conflict has been detected by the conflict detector module 144 between the partial vector clock and the local vector clock 306, the local vector clock generator module 138 updates the local vector clock 306 to include values identified in the partial vector clock Now referring to FIG. 5, a functional block diagram that illustrates operation of the conflict detector module 144 in response to receipt of the update notification from computing system B 104 is shown. The conflict detector module 144 retrieves the estimated local vector clock 306 and a remote vector clock 502 (e.g., from the remote vector clock information 140) and performs a comparison between the two clocks. In the vast majority of situations, the conflict detector module 144 determines that there is no update conflict with respect to the update notification. In such case, the update is written to the database 114 in the first disk 108 without requiring any reading from the first disk 108. When the conflict detector module 144 detects a conflict based upon the comparison, the conflict detector module 144 confirms the conflict by reading the GCN included in the metadata for the record that is being updated and updating the estimated local vector clock 306 to include such GCN. For instance, when the first record 128 is to be updated and the conflict detector module 144 detects a potential conflict, the conflict detector module 144 obtains the GCN from the first metadata 206 and updates the estimated local vector clock 306 to include such GCN. The conflict detector module 144 can confirm whether or not a conflict exists by performing a comparison between the updated estimated local vector clock 306 and the remote vector clock 502. When the conflict detector module 144 determines that the initial conflict determination was a false positive, the conflict detector module 144 can output an indication that there is no update conflict for the update notification and computing system A 102 writes the update to the first record 128. In contrast, when the conflict detector module 144 confirms that a conflict exists based upon the aforementioned comparison, the conflict detector module 144 initiates a conventional conflict resolution procedure (e.g., by performing a merge with respect to data stored in the first record 128 and information included in the update notification).

Figure 6:
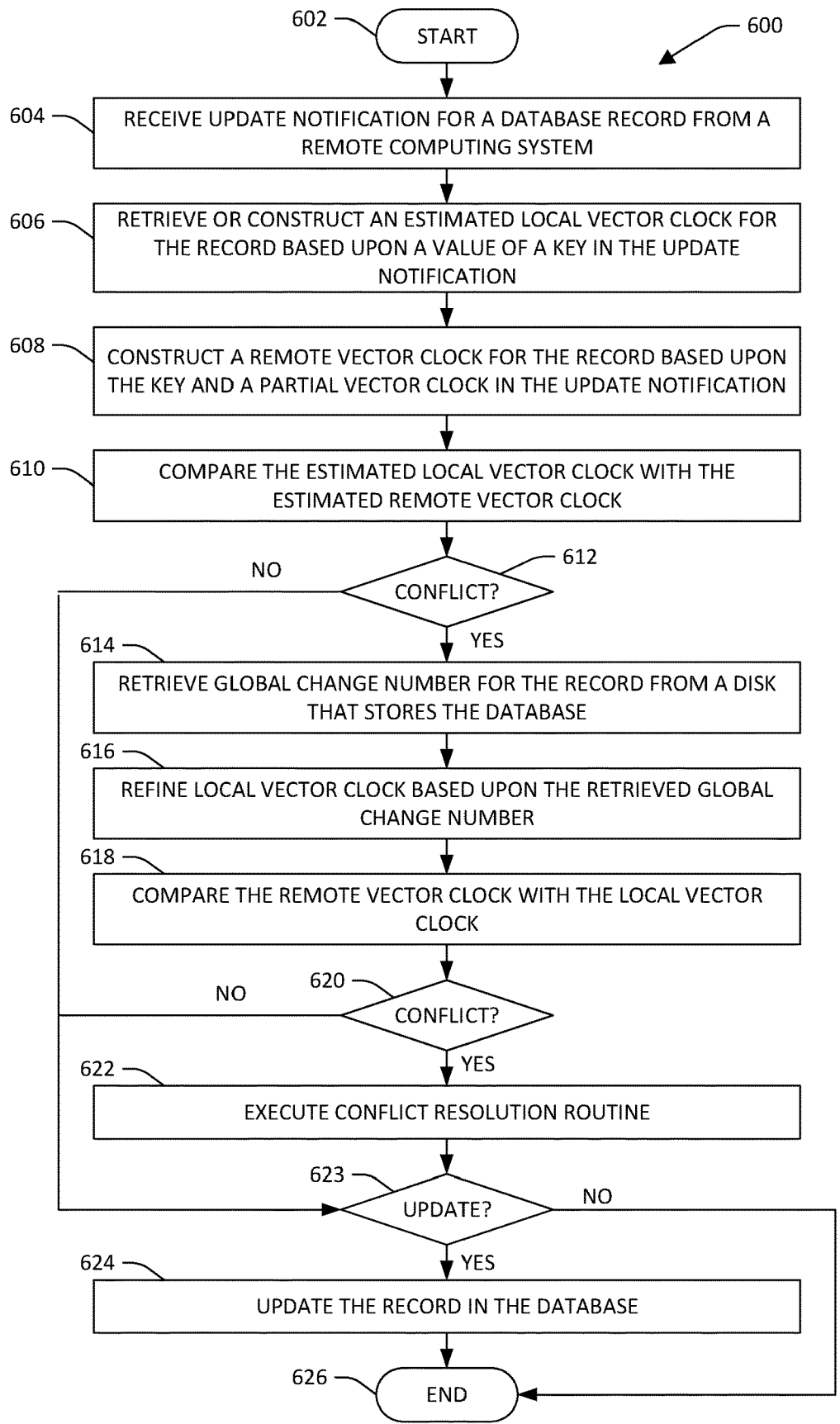
FIG. 6 is a flow diagram illustrating a method for detecting an update conflict with respect to the database that is replicated across computing systems of the geo-replication computing architecture of FIG. 1.
Figure 7:
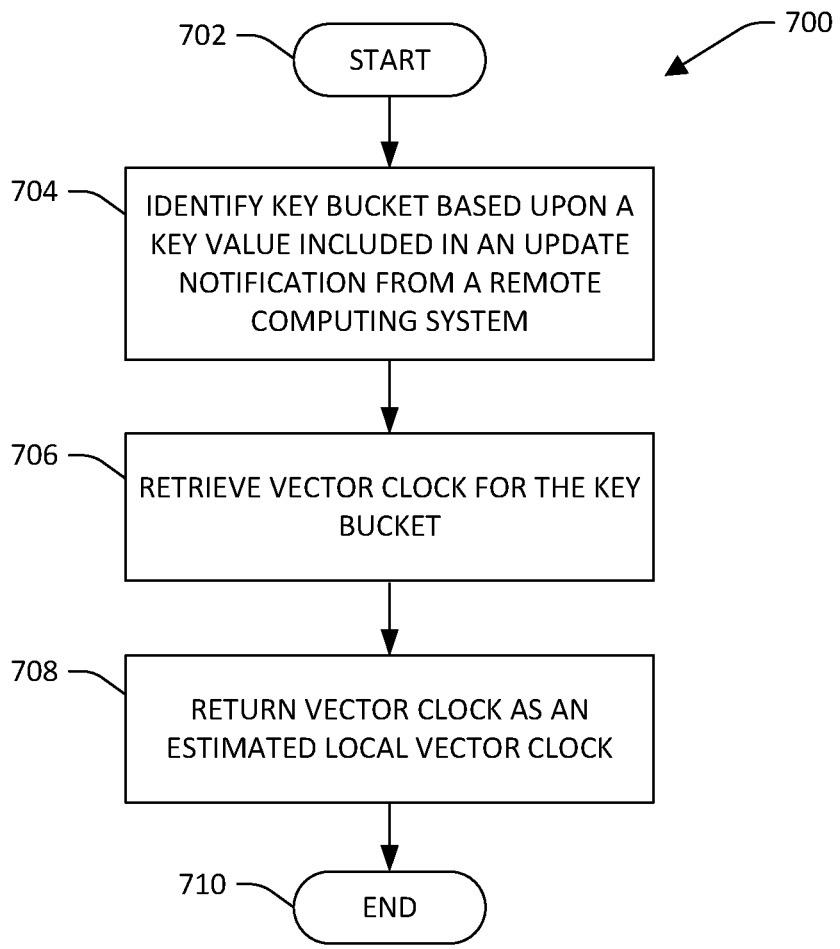
FIG. 7 is a flow diagram illustrating a method for generating a local vector clock for a record of a database that is to be updated.
Figure 8:
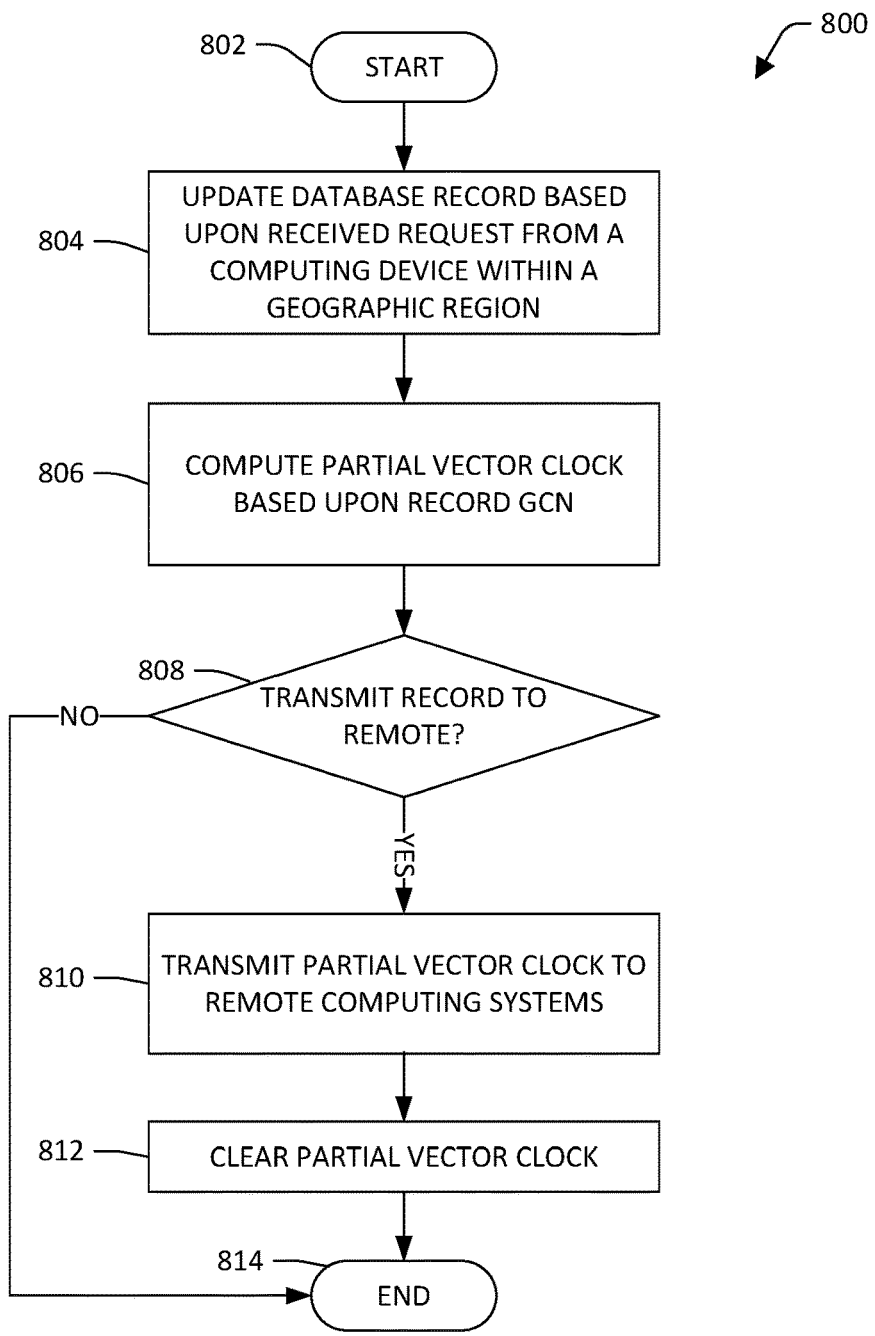
FIG. 8 is a flow diagram illustrating a method for generating a partial vector clock.

FIGS. 6-8 illustrate exemplary methodologies relating to conflict detection in geo-replication architectures. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring solely to FIG. 6, a method 600 performed by a computing system (e.g., computing system A 102) in a geo-replication computing architecture is illustrated. The method 600 starts at 602, and at 604 an update notification for a database record is received from a remote computing system that is included in the geo-replication architecture. The update notification includes a value for a key for the database record, a partial vector clock, and an update to the database record that has been made by the remote computing system. The partial vector clock includes a GCN generated by the remote computing system. The partial vector clock may include a second GCN generated by a second remote computing system that previously updated the database record at the second remote computing system.

At 606, an estimated local vector clock for the database record is retrieved or constructed based upon a value of a key in the update notification. At 608, a remote vector clock for the database record is generated based upon the key and the partial vector clock included in the update notification.

At 610, a comparison is performed between the estimated local vector clock constructed at 606 and the remote vector clock constructed at 608. At 612, a determination is made as to whether a conflict may exist with respect to the update notification based upon the comparison. When it is determined at 612 that a conflict may exist, the method 600 proceeds to 614, where metadata assigned to the database record is read from computer-readable storage (e.g., a solid state drive or a hard disk drive) that stores the database. The metadata includes a GCN that identifies a computing system that most recently updated the database record. The GCN also is indicative of when the computing system updated the database record.

At 616, the estimated local vector clock is refined based upon the retrieved GCN, and at 618 the remote vector clock constructed at 606 is compared with the refined local vector clock constructed at 616. At 620, a determination is made as to whether the conflict remains based upon the comparison performed at 618. When it is determined that the conflict remains, at 622 a conflict resolution routine is executed. Subsequent to executing the conflict resolution routine, the method 600 proceeds to 623 where a determination is made whether the update notification indicates that an update is to be made to the record in the database. Furthermore, when it is determined at either 612 or 620 that there is no conflict, the method 600 proceeds to 623. If it is determined at 623 that an update is to be made to the record, the method proceeds to 624, and the record in the database is updated based upon content of the update notification received at 604 and the methodology completes at 626. If it is determined that an update is not to be made, the method proceeds to 626 and completes.

Turning to FIG. 7, a flow diagram depicting a method 700 for constructing an estimated local vector clock (e.g., act 606 of method 600) is illustrated. The method 700 starts at 702, and at 704 a key bucket in a table in memory is identified, where the table includes identifiers for key buckets and local vector clocks for those key buckets. The key bucket identifiers can be or be based upon output of a hash function when provided with keys as input. The key bucket is identified based upon the key value in the update notification received at 604 of the method 600.

At 706, the local vector clock assigned to the key bucket is retrieved from the table. At 708, the local vector clock retrieved at 706 is returned as the estimated local vector clock for the database record. The method 700 completes at 712.

Reference is now made to FIG. 8, which depicts a method 800 for transmitting a partial vector clock to remote computing systems in a geo-replication architecture. In an example, the method 800 is performed by a local computing system in the geo-replication architecture that is in network communication with the remote computing systems. The method 800 starts at 802, and at 804 a record of a database stored in computer-readable storage of the local computing system is updated based upon an update request received by the local computing system. The update request can be received from a computing device that is in a geographic region (e.g., city, state, country, etc.) with the local computing system. The update request can alternatively be received from another computing system in the geo-replication architecture (e.g., a computing system in a different geographic region than the local computing system). At 806, a partial vector clock is computed or retrieved from an accumulated GCN that is associated with the record and is stored in memory of the local computing system. In exemplary embodiments, the accumulated GCN can include GCNs for all computing systems from which updates to the record have been received since a last time the local computing system transmitted a partial vector clock pertaining to the record. At 808 a determination is made whether the update to the record must be transmitted to other remote computing systems in the geo-replication architecture. For instance, if the update request received at 804 is from a computing system in the geo-replication architecture in a region different from the local computing system, it is determined that the update to the record need not be transmitted to remote computing systems, and the methodology 800 proceeds to 814, whereupon the method 800 ends. If the update request received at 804 is from a computing device in the same geographic region as the local computing system, it is determined at 808 that the update to the record must be transmitted to other remote computing systems (e.g., outside of the geographic region) in the geo-replication architecture. If it is determined at 808 that the update to the record must be transmitted to remote computing systems, the method 800 proceeds to 810, and the accumulated GCN is transmitted as a partial vector clock for the record. The accumulated GCN/partial vector clock is cleared (e.g., re-initialized or set to zero) 812, and the method 800 completes at 814.

An example is now set forth by way of illustration, and not by limitation. The accumulated GCN for a record can initially be empty (cleared). The following GCNs can be received by the local computing system where A represents the local computing system and B-D represent remote computing systems (e.g., computing systems in different geographic regions than A): B20, C30, B30, A10, B40, at times T0, T1, T2, T3, T4, respectively. At T0, A updates the accumulated GCN, denoted by InMem VC, to InMem VC=(B20), and A does not transmit the partial vector clock (e.g., because B originated the update to the record). At T1, A updates InMem VC to InMem VC=(B20, C30), and A does not transmit the partial vector clock. At T2, A updates InMem VC to InMem VC=(B30, C30), and A does not transmit the partial vector clock. At T3, A updates InMem VC to InMem VC=(A10, B30, C30), A sends the partial vector clock (A10, B30, C30) to remote computing systems in the geo-replication architecture (e.g., computing systems B-D), and A then clears the partial vector clock, whereupon InMem VC=(empty). At T4, A updates InMem VC to InMem VC=(B40), and does not transmit the partial vector clock.

Figure 9:
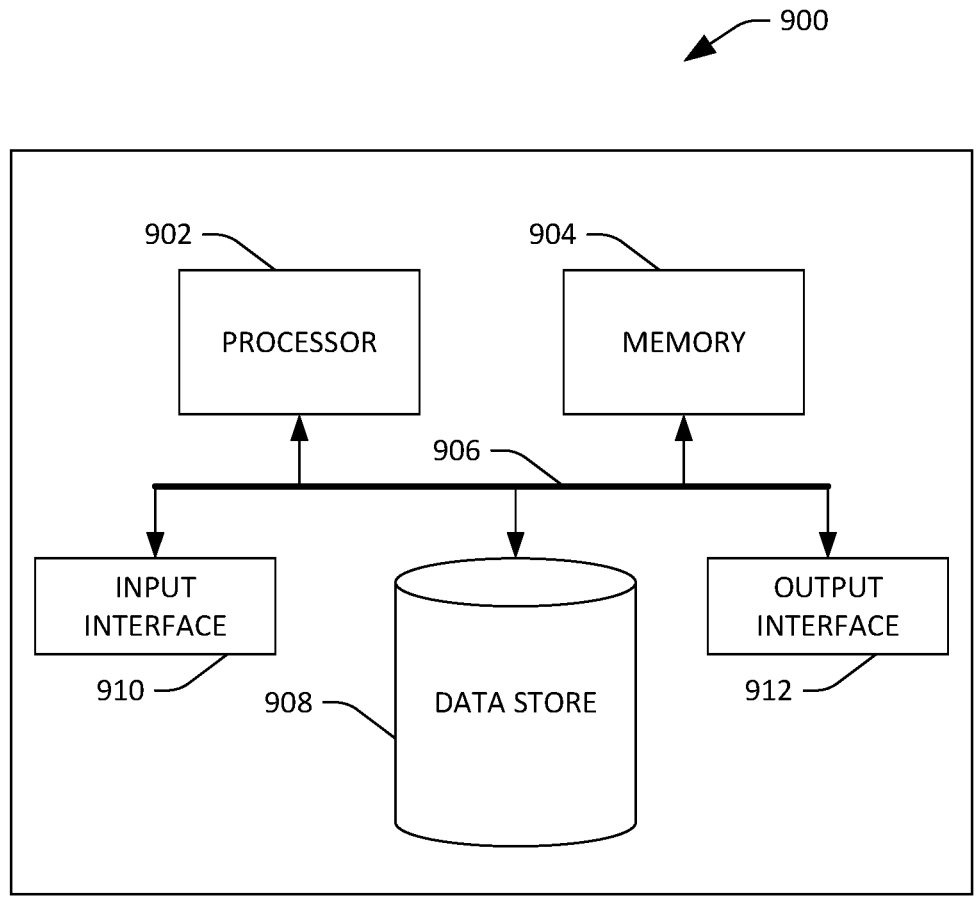
FIG. 9 depicts a computing device.

Referring now to FIG. 9, a high-level illustration of an exemplary computing device 900 that can be used in accordance with the systems and methodologies disclosed herein is illustrated. For instance, the computing device 900 may be used in a geo-replication architecture, where the computing device 900 can transmit partial vector clocks to other computing devices in the geo-replication architecture. By way of another example, the computing device 900 can be used in a system that detects conflicts in a geo-replication architecture. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store vector clocks, partial vector clocks, GCNs, a table that includes identifiers for key buckets and local vector clocks assigned to the key buckets, etc.

The computing device 900 additionally includes a data store 908 that is accessible by the processor 902 by way of the system bus 906. The data store 908 may include executable instructions, records of a database, metadata assigned to the records, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system in a geo-replication computing architecture, the computing system comprising:
   computer-readable storage that includes a database that is replicated across N computing systems of the geo-replication computing architecture, where the database includes a record that has a key value, wherein N is a nonzero integer;
   a processor that is operably coupled to the computer-readable storage; and memory storing instructions that, when executed by the processor, cause the processor to perform acts comprising:

receiving an update request from a computing device that is in communication with the computing system, where the update request includes the key value of the record and an update to the record;

identifying the record in the database based upon the key value in the update request;

in response to identifying the record in the database, updating the record based upon the update in the update request;

generating a partial vector clock based upon the updating of the record, where the partial vector clock incudes M Global Change Numbers (GCNs), where M is a nonzero integer less than N, and further where the M GCNs include a GCN that identifies the computing system and is indicative of when the computing system updated the record; and transmitting an update notification to other computing systems in the geo-replication architecture, where the update notification is configured to cause the other computing systems to update the record of the database with the update in the update request.

2. The computing system of claim 1, where the partial vector clock includes a second GCN that identifies a second computing system that previously updated the record, where the second GCN is included in the partial vector clock due to the second computing system having updated the record after the computing system most recently transmitted another update notification for the record.

3. The computing system of claim 1, the acts further comprising updating metadata for the record in the computer-readable storage to include the GCN, where the GCN is the only GCN included in the metadata.

4. The computing system of claim 1, where the computer-readable storage comprises at least one of a solid state drive or a hard disk drive.

5. The computing system of claim 1, where the update notification additionally includes the key value and the update to the record.

6. The computing system of claim 1, the acts further comprising:

subsequent to transmitting the update notification to the other computing systems in the geo-replication architecture, receiving a second update notification from a second computing system in the N computing systems, where the second notification includes the key value, a second partial vector clock, and a second update that is to be made to the record in the database;

determining, based upon the key value and the second partial vector clock, that there is no update conflict with respect to the second update notification;

in response to determining that there is no update conflict with respect to the second update notification, identifying the record in the database based upon the key value in the second update notification; and updating the record in the database to include the second update in response to identifying the record in the database.

7. The computing system of claim 6, where determining that there is no update conflict with respect to the second update notification comprises:

determining an estimated local vector clock for the record based upon the key value included in the second update notification;

constructing an updated remote vector clock for the record based upon the second partial vector clock included in the second update notification;

performing a comparison between the estimated local vector clock and the updated remote vector clock, wherein the determination that there is no update conflict with respect to the second notification is based upon the comparison.

8. The computing system of claim 7, wherein the determination that there is no update conflict with respect to the second notification is made without reading from the computer-readable storage.

9. The computing system of claim 7, wherein constructing the remote vector clock for the record comprises:

retrieving a remote vector clock from memory, where the remote vector clock is assigned to the key and the second computing system; and updating the remote vector clock based upon the partial vector clock in the second update notification to form the updated remote vector clock.

10. The computing system of claim 7, wherein determining the estimated local vector clock comprises:

identifying a key bucket based upon the key value in the second update notification; and retrieving the estimated local vector clock from a table stored in memory, where the estimated local vector clock is assigned to the key bucket in the table.

11. A method performed by a computing system that is amongst N computing systems in a geo-replication architecture, wherein N is a nonzero integer, the method comprising:

updating a record in a database that is stored in computer-readable storage, where updating the record in the database comprises:

including a Global Change Number (GCN) in metadata assigned to the record in the database, where the GCN identifies the computing system, and further where the GCN is indicative of when the computing system updated the record; and writing data to the record in the database;

in response to updating the record in the database, transmitting an update notification to other computing systems in the geo-replication architecture, where the update notification includes a partial vector clock that has fewer than N entries, where the partial vector clock includes the GCN, and further where the update notification is configured to cause the other computing systems to write the data to the record in the database that is stored in computer-readable storage of the other computing systems.

12. The method of claim 11, where the computer-readable storage is a solid state drive.

13. The method of claim 11, where the partial vector clock includes a second GCN generated by a second computing system in the geo-replication architecture, where the second GCN indicates that the second computing system previously updated the record in the database.

14. The method of claim 11, where the GCN is the only GCN included in the metadata that is assigned to the record.

15. The method of claim 11, further comprising:

subsequent to transmitting the update notification to the other computing systems, receiving a second update notification from a second computing system in the geo-replication architecture;

determining whether the second update notification is associated with an update conflict without reading from the computer-readable storage that stores the database.

16. The method of claim 11, wherein determining whether the second notification is associated with the update conflict comprises:
- determining an estimated local vector clock for the record based upon a key value for the record included in the second update notification; and
- constructing an estimated remote vector clock for the record based upon a second partial vector clock included in the second update notification.

17. The method of claim 16, wherein determining the estimated local vector clock for the record comprises:
- identifying a key bucket based upon the key value in the second update notification, wherein the key bucket includes a plurality of keys; and
- retrieving the estimated local vector clock based upon the identified key bucket, wherein the estimated local vector clock is a vector clock representative of changes to records associated with the plurality of keys.

18. A non-transitory computer-readable storage medium of a computing system that is amongst N computing systems in a geo-replication architecture, wherein N is a nonzero integer, where the computer-readable storage medium comprises instructions that, when executed by a processor, cause the processor to perform a method comprising:
- updating a record in a database that is stored in a storage device that comprises at least one of a solid state drive or a hard disk drive, where updating the record in the database comprises:
  - including a Global Change Number (GCN) in metadata assigned to the record in the database, where the GCN identifies the computing system, and further where the GCN is indicative of when the computing system updated the record; and
  - writing data to the record in the database;
- in response to updating the record in the database, transmitting an update notification to other computing systems in the geo-replication architecture, where the update notification includes a partial vector clock that has fewer than N entries, where the partial vector clock includes the GCN, and further where the update notification is configured to cause the other computing systems to write the data to the record in the database that is stored in storage devices of the other computing systems.

19. The non-transitory computer-readable storage medium of claim 18, where the partial vector clock includes a second GCN generated by a second computing system in the geo-replication architecture, where the second GCN indicates that the second computing system previously updated the record in the database.

20. The non-transitory computer-readable storage medium of claim 18, wherein the method further comprises:
- subsequent to transmitting the update notification to the other computing systems, receiving a second update notification from a second computing system in the geo-replication architecture; and
- determining whether the second update notification is associated with an update conflict without reading from the storage device that stores the database.

* * * * *